July 10, 1951  C. ADLER, JR  2,560,265
AIRPLANE PROXIMITY INDICATOR
Filed Dec. 24, 1948  3 Sheets-Sheet 1

INVENTOR.
Charles Adler Jr.
BY
Cushman, Darby & Cushman
Attorneys.

July 10, 1951  C. ADLER, JR  2,560,265
AIRPLANE PROXIMITY INDICATOR
Filed Dec. 24, 1948  3 Sheets-Sheet 2

INVENTOR.
Charles Adler Jr.
BY
Cushman, Darby & Cushman
Attorneys.

July 10, 1951 C. ADLER, JR 2,560,265
AIRPLANE PROXIMITY INDICATOR
Filed Dec. 24, 1948 3 Sheets-Sheet 3

INVENTOR.
Charles Adler Jr.
BY
Cushman, Darby & Cushman
Attorneys

Patented July 10, 1951

2,560,265

UNITED STATES PATENT OFFICE 2,560,265

AIRPLANE PROXIMITY INDICATOR

Charles Adler, Jr., Baltimore, Md.

Application December 24, 1948, Serial No. 67,143

1 Claim. (Cl. 343—112)

This invention relates to a proximity indicator which acts as a signal for aircraft in flight to advise the respective pilots of the travelling aircraft when the location of their aircraft with respect to each other presents the possibility of mid-air collision. The signal is, therefore, useful under all flying conditions (night and day), and has particular utility in eliminating the well-recognized dangers occasioned by flying in fog, clouds, or other low visibility situations, notably, when flying toward the sun on a hazy day.

For instance, when two aircraft are flying toward each other at substantially the same altitude, and visibility conditions are poor, there is the possibility of mid-air collision due to the present high speed of aircraft and which frequently prevents pilots from avoiding such accidents. Not only have mid-air collisions occurred due to hazy sun conditions or fog but nearly every pilot has experienced at some time near accidents due to one or the other conditions mentioned. Consequently, the necessity for some positive and simple means to prevent such accidents becomes of paramount importance, particularly due to the ever-increasing high speeds of aircraft, and this is recognized by military, commercial and private pilots alike.

It is, therefore, the primary object of my invention to provide a proximity signal for aircraft in flight which will effectively solve the problem above-explained, and which will inform the pilots of the respective aircraft of the relative position of the other when travelling at substantially the same altitude within a predetermined range, and whether to the right, left, dead-ahead or rear, whereby the pilots may alter their courses in time to avoid any possibility of collision in mid-air.

Referring to the drawings.

Figure 1:
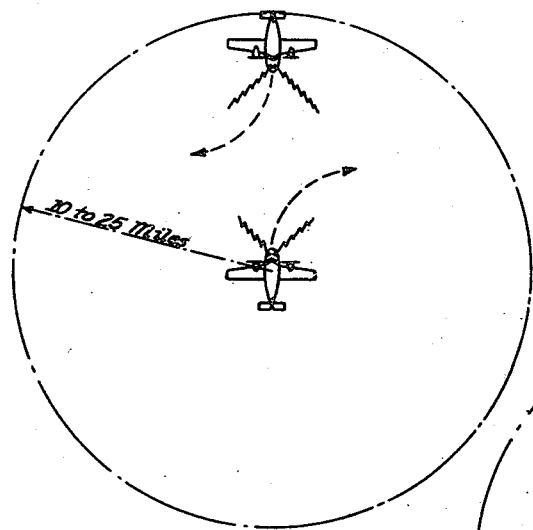
Figure 1 is a diagrammatic view indicating two aircraft travelling in dead-ahead relation and within the range of the present signal.
Figure 2:
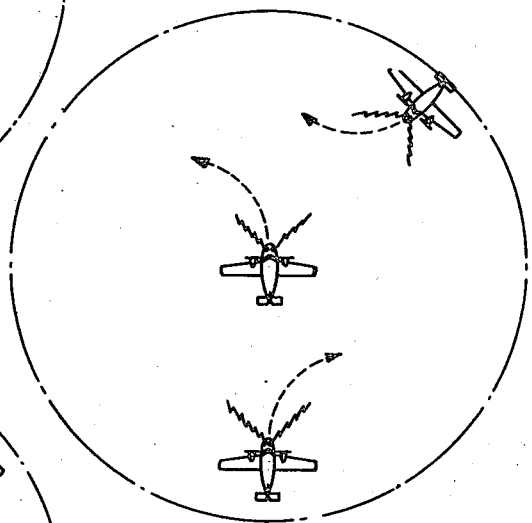
Figure 2 is a similar view showing two aircraft travelling toward each other with their flight paths in angular relation, and also showing one aircraft travelling ahead of the other, the forward aircraft travelling at a slower speed than the rearward aircraft.
Figure 3:
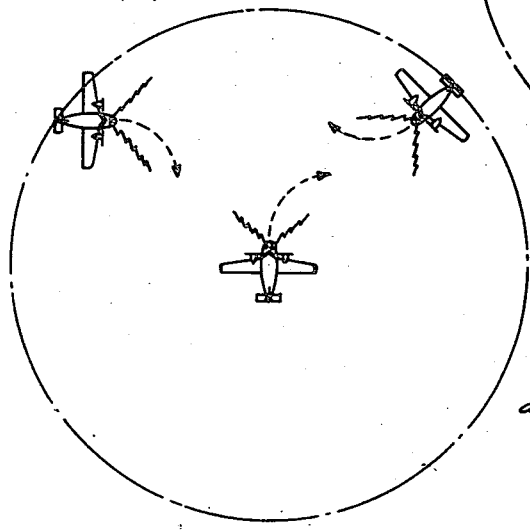
Figure 3 is a similar view showing three aircraft in different positions travelling toward each other, and each in angular relation to the other.

In each of Figures 1 to 3 it is understood that the aircraft are travelling at substantially the same altitude.

Figure 7:
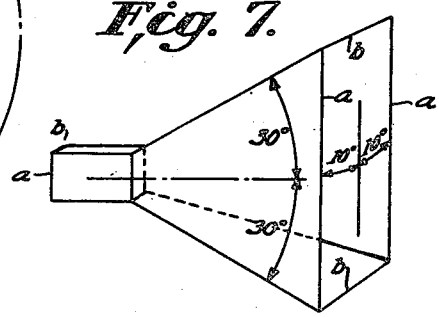
Figure 4:
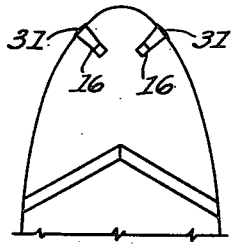
Figure 5:
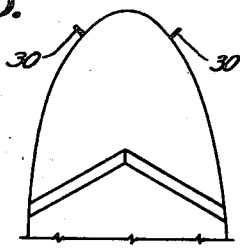
Figure 6:
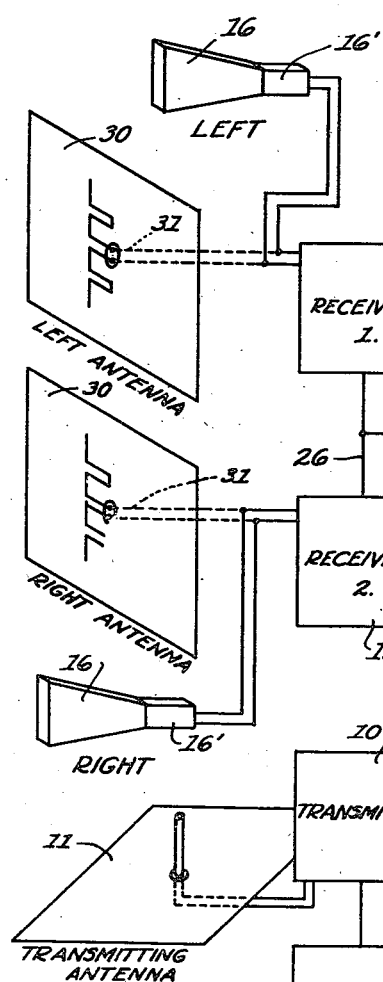
Figure 8:
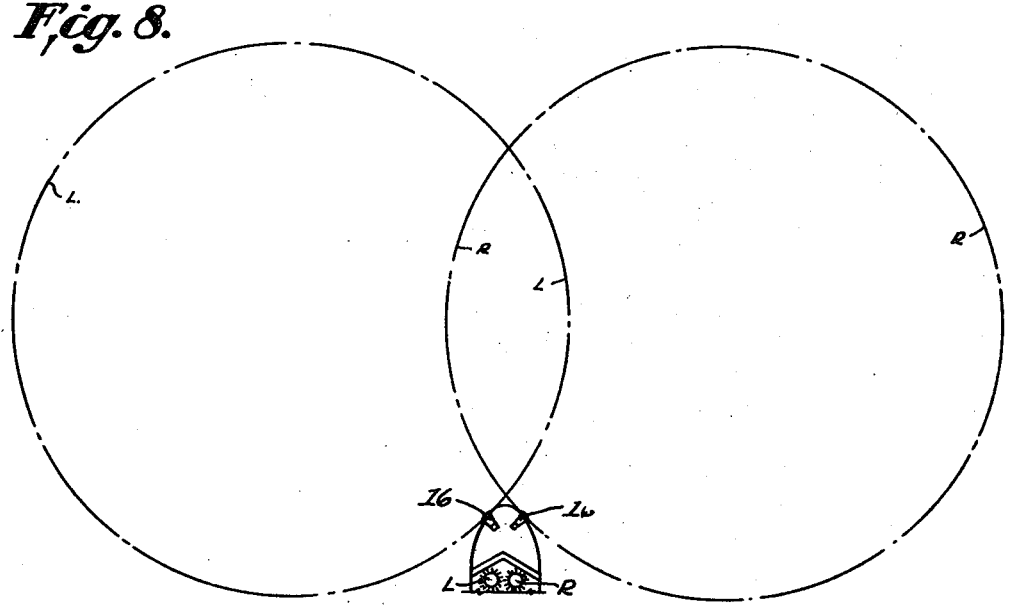
Figure 9:
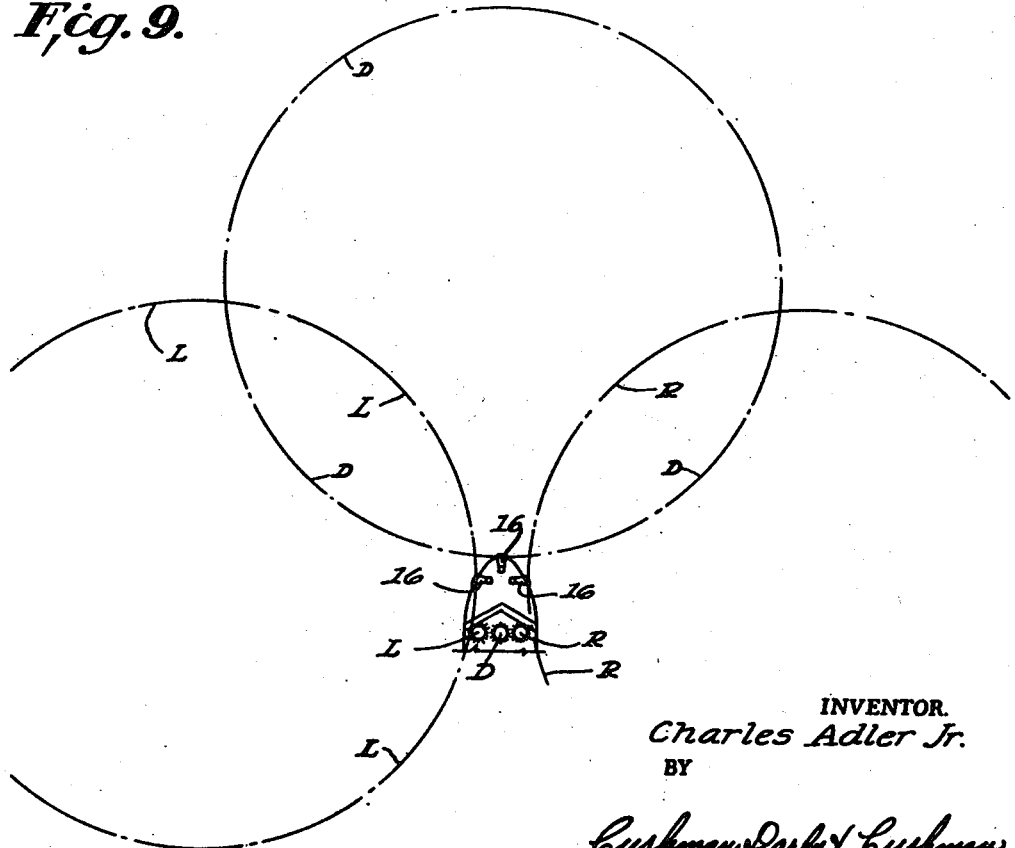

Figure 4 is a diagrammatic view indicating receiving antennae of the horn-type disposed adjacent the forward portion of the aircraft, for example, within the nose where a nose is available;

Figure 5 is a view similar to Figure 4 wherein the antennae are of the co-linear type and mounted externally and forwardly of the aircraft, and wherein the bright, metallic outer surface of the aircraft nose or fuselage acts as a reflector for the micro-waves;

Figure 6 is a block diagram of the sending and receiving electrical layout which is provided in each of the aircraft;

Figure 7 is a perspective detail view of a "horn" antenna unit;

Figure 8 is a diagrammatic view illustrating two antennae and associated horizontal beam patterns; and Figure 9 is a similar diagrammatic view showing three antennae.

Referring to Figure 6, the apparatus disclosed is all of conventional construction, and no claim is here made thereto. The same apparatus will be installed on all aircraft and will be continuously operated while the aircraft are in flight.

This apparatus comprises a transmitting means 10 of any suitable type which will transmit continuously impulses of a predetermined assigned high frequency, e. g., micro-waves, intermittently over a limited range. Connected with the transmitter 10 is the transmitting antenna 11 which is mounted to extend vertically on the aircraft at any suitable location, e. g., on the top or bottom of the fuselage. Connected to the transmitter 10 is a suitable modulator 11' and a coding keyer 12 whereby micro-waves of a specific assigned frequency or wave band will be continuously transmitted while the aircraft are in flight. The impulses sent out from this transmitting means may have any suitable range but, preferably, encompass a relatively short range since this is all that is required, e. g., ten to twenty-five or fifty miles, in all directions. This sending vertical antenna 11 is omni-directional and will send out intermittent periodic impulses in all directions within the radius or range above-indicated.

The receiving system includes two or more receivers 15, two or three being preferably employed, and two being illustrated in Figure 6. Connected respectively to the receivers 15 are suitable antennae, preferably of the horn-type, as indicated at 16, one indicated as "left" and the other indicated as "right." Also, connected to the receivers are band pass filters 17 which will render the receiving apparatus selective to the micro-waves or ultra-high frequency impulses sent out by the transmitting means of other aircraft. Connected to the filters 17 are lamp-control circuits 18 which, in turn, are connected to lamps 19, preferably of different colors, and also marked, if desired, to indicate "left" and "right," as in Figure 8 where the beam spread receptivity of the two antennae 16 is also shown by the letters L and R. A third receiving circuit may be included similar to the circuits described and three lamps provided, as indicated at L, D, and R, in Figure 9 to signal "left," "dead-ahead," and "right." Figure 9 also shows at L, D and R the beam spread receptivity of the three respective antennae 16.

While I have illustrated the use of lamps 19, which are preferably of the ordinary commercial type (about five candle power), other visible or audible indicating means may be employed. I prefer ordinary commercial lamps for two reasons, namely, they are inexpensive and have a long life, and, furthermore, lamps are preferable in that their intensities of illumination may be observed and compared, thereby giving a more detailed indication of the proximity or bearing of other aircraft. It will be appreciated that the use of visual indicating means is desirable since ordinarily pilots will have on their earphones for regular navigational purposes. A single receiver 15 and signal lamp 19 may be employed and connected to the antennae 16. In such case, a manually operated selector switch is used to determine which antennae is receiving the stronger signal.

The receiving apparatus described and which will pick up selectively the impulses transmitted from other aircraft within the range or radius, positively assures that the pilot will be advised of the proximity of the other aircraft flying at substantially the same altitude. This is accomplished by utilizing an antenna such as the "horn-type" of antenna 16. These antennae have a substantially rectangular body 16' which is flared outwardly on both dimensions, as shown in Figure 7. The horns are positioned with the longest dimensions of their mouths extending vertically and the flare of the walls of the horn is unequal, e. g., the side walls a—a flare laterally at an angle of about 10° with respect to the vertical and the top and bottom walls b—b flare vertically about 30° to the horizontal. By reason of this construction, the vertical beam width of the receiver is limited to exclude reception of the impulses from other aircraft in flight where the latter are flying at an altitude which is not menacing but will selectively pick up impulses whenever such other aircraft are at substantially the same altitude or at an altitude which might possibly be menacing, i. e., the antennae are dimensioned and positioned for the reception of vertically polarized electromagnetic waves. For example, the horns are so constructed and arranged as to be limited to picking up or receiving a beam width vertically of approximately 20°. The receptivity of the horns should be such as to pick up a relatively wide spread horizontally, e. g., approximately 60° or greater to the longitudinal axis of the aircraft. The horns will each receive signals from the left or right of the aircraft, as well as dead-ahead and to the rear thereof.

This receptivity of the receivers or horns must be controlled in order that they will be selective with respect to impulses sent out by aircraft travelling at the same altitude, i. e., will be limited to picking up a beam width vertically of about 20 more or less to the horizontal, as above stated from all directions. It is for this reason that the shorter dimensions of the openings in the horns are disposed horizontally and the longer dimensions of the horns are disposed vertically, as shown. Thus, when aircraft are at substantially the same altitude the "left" horn 16 will receive beams from directly forward of the aircraft and to the left thereof, while the "right" horn will pick up beams from directly forward of the aircraft and to the right thereof, as shown in Figure 8 where the beam patterns overlap. As shown in Figures 8 and 9, the horn antennae are disposed in horizontal angular relation to each other whereby the beam patterns overlap and the total area of receptivity horizontally is greater than the receptivity of each individual horn. In Figure 9 the same effect is obtained but, as stated, provision is made for a central or dead-ahead receiver 16, the beam pattern D of which overlaps the left and right beam patterns so that when two aircraft are approaching in dead-ahead relation, the central receiver will directly receive the impulses which, however, will also be received by the left and right receivers but to a lesser extent, depending on whether the aircraft are to the right or left of the dead-ahead relation.

The signal lights will be illuminated and afford a convenient means for indicating more exactly the position of another aircraft. That is to say, when an aircraft is to the right, its signal will be strongly received by the right receiver, and the right lamp will be brilliantly illuminated, while the left lamp or the center and left lamp, as the case may be, will be progressively less brilliantly energized. It is possible that the two lamps or the three lamps will be simultaneously illuminated, but the extent of their brilliance can be readily observed, and the location of the other aircraft easily understood from simple comparison. This is important in that having observed the most brilliantly lighted lamp, the pilot can turn to the left or right and as he moves from his course, the comparative brilliance of the lamps will change to indicate what further alteration of the course is necessary until all of the lamps are finally de-energized, indicating that his position is clear.

Referring to Figure 6, the coding keyer 12 is connected by a line 25 to the connection 26 between the receivers 15 for the purpose of assuring that the impulses transmitted by a particular aircraft will not be picked up by its own receiving apparatus. This cutting out from reception of one's own transmitted signals may be accomplished in various ways, but I prefer to short-circuit the antennae 16 by the connection 25, as described. In this manner, the coding keyer which comprises switching means will prevent reception through receivers 1 and 2 by short circuiting the leads from the antennae 16. As explained above, the signals are transmitted at irregular periodical intervals, i. e., intermittently, so that during the interval when one aircraft is transmitting, the other will be receiving, and vice versa, and whenever one aircraft is transmitting it will not receive either its own transmitted signals or those of another aircraft. As will be appreciated, the transmitted impulses are short and irregularly spaced, but in rapid succession, i. e., coded, so that at all times the receivers will receive each other's signals during the interval when respectively they are not transmitting.

In the situation presented by Figure 1 with the aircraft in dead-ahead relation, all receivers 15 will pick up the signal and all lamps 19 will be intermittently flashed or energized with substantially equal brilliancy. Thus, the pilots of the respective aircraft, although they cannot see each other, will be apprised of each other's presence at the same altitude, dead-ahead within the predetermined radius of the transmitter, and will be able to alter their courses by each turning to the right and thereby avoid any possibility of collision.

In a situation presented by Figure 2 where one of the approaching aircraft is at the same altitude but at the right of the other and travelling along an angular path, the signals will be likewise picked up by each aircraft. That is, the "left" antenna of the aircraft approaching from the right will pick up the signal from the aircraft moving straight ahead and its "left" lamp 19 will be flashed brighter than its "right" lamp 19 as this also will be flashed. The "right" antenna 16 of the aircraft moving straight ahead will pick up the signal and its "right" lamp 19 will be flashed brighter than its "left" lamp as the latter will also be flashed. Thus, the pilots will know they are at the same altitude, within a definite radius, and their relative locations with respect to each other. In further explanation of the foregoing, in the case of the aircraft approaching from the right, the right antenna will also pick up the signal, but to a weaker extent than the left antenna, and it is for this reason the right lamp of such aircraft will flash weakly in contrast to the brilliant flashing of the left lamp, indicating more exactly the bearing or angular relation of the flight paths of the two aircraft with respect to each other. Where the aircraft moving straight ahead follows a path at a right angle to the aircraft approaching from the left, as in Figure 3, or more or less than a right angle, the signal picked up by the right antenna of the aircraft approaching from the left would be of brilliant intensity in comparison with the signal picked up by its left antenna and the left antenna of the aircraft moving straight ahead will be brilliant in comparison with the signal picked up by its left antenna whereby the pilots will know more nearly the relation or bearing of their aircraft. This is due to the fact that the transmission from both aircraft is omni-directional. Since this is the case, and referring to Figure 2, which illustrates a condition where the aircraft are following each other, the lamps of the trailing aircraft will be flashed and this faster aircraft in the rear will change course.

In the case of the conditions shown in Figures 2 and 3 where there are more than two aircraft, each of the aircraft will receive a signal in the same manner as above-described and in time to change course and avoid collision. It will be noted that in the condition of Figure 2, the aircraft moving straight ahead will turn to the left while the aircraft approaching at an angle from the right will alter course to the right as will the "following" aircraft. In the condition shown in Figure 3, the forward moving aircraft and the aircraft moving toward it at an angle as well as the aircraft moving at a right angle to the forward moving aircraft will all alter course to the right.

The aircraft will continue to alter course in accordance with the signals received, as indicated by the energization of the lamps, and until their lamps are all de-energized. While, as a general condition, the pilots will turn to the right in cases where the comparative brilliance of the lamps indicates a turn in the opposite direction to be necessary, the path of the aircraft will be altered in this manner.

Referring to Figure 6, I have shown as an alternative to the use of horn antennae, colinear antenna 30 which may be suitably connected to the receivers 15, as shown in dotted lines at 31. These antennae will be mounted forwardly of the aircraft usually on either side of the fuselage where the bright metallic surface of the fuselage can act as a wave reflector, as shown in Figure 5.

Referring to Figure 4, as well as Figures 8 and 9 I have shown the horn antenna 16 mounted in horizontal angular relation to each other forwardly of the aircraft internally of the nose and the openings 31 in the fuselage are sealed with a non-metallic seal usually of resin or other plastic which is non-conductive, in order to prevent drag, and avoid interfering with the action of the antenna.

In Figure 5 the antennae 30 are shown vertically disposed externally of the aircraft and on either side of the nose with the metallic surface of the nose acting as wave-reflector for the ultra-high frequency electromagnetic waves.

I claim:

A proximity indicator for aircraft in flight to advise the respective pilots of the travelling aircraft when the location of their aircraft with respect to each other presents the possibility of mid-air collision, comprising on each of said aircraft means for continuously transmitting impulses of a predetermined high frequency, said transmitting means being omni-directional, a plurality of receiving means on said aircraft for receiving only impulses of the said transmitted frequency, said plurality of receiving means being directed to receive substantially in the plane of the altitude of said aircraft, and means connected to the receiving means respectively for indicating the position of another aircraft flying within the range of said transmitting means, said receiving means being selective to receive the impulses of aircraft flying at substantially the same altitude and within the range of the transmitting means.

CHARLES ADLER, JR.

REFERENCES CITED

The following references are of record in the file of this patent:

UNITED STATES PATENTS

| Number | Name | Date |
|---|---|---|
| 1,940,547 | Jacobs | Dec. 19, 1933 |
| 1,989,086 | Diamond et al. | Jan. 29, 1935 |
| 2,090,359 | Robinson | Aug. 17, 1937 |
| 2,104,075 | Franklin | Jan. 4, 1938 |
| 2,146,724 | Dunmore | Feb. 14, 1939 |
| 2,157,122 | Dunmore | May 9, 1939 |
| 2,208,921 | Busignies | July 23, 1940 |
| 2,231,929 | Lyman | Feb. 18, 1941 |
| 2,255,042 | Barrow | Sept. 9, 1941 |
| 2,378,604 | Wallace | June 19, 1945 |
| 2,403,603 | Korn | July 9, 1946 |